United States Patent
Long et al.

(10) Patent No.: US 6,951,018 B2
(45) Date of Patent: Sep. 27, 2005

(54) METHOD AND APPARATUS FOR EFFICIENTLY TRACKING MONITORS

(75) Inventors: Dean R. E. Long, Boulder Creek, CA (US); Nedim Fresko, San Francisco, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 993 days.

(21) Appl. No.: 09/802,627

(22) Filed: Mar. 8, 2001

(65) Prior Publication Data

US 2002/0129079 A1 Sep. 12, 2002

Related U.S. Application Data

(60) Provisional application No. 60/208,025, filed on May 30, 2000.

(51) Int. Cl.$^7$ .................................................. G06F 9/46
(52) U.S. Cl. ........................ 718/100; 718/104; 707/206
(58) Field of Search ................................. 718/100, 101, 718/102, 106, 104; 707/206

(56) References Cited

U.S. PATENT DOCUMENTS

| | | | |
|---|---|---|---|
| 5,701,470 A | 12/1997 | Joy et al. ..................... | 395/614 |
| 5,875,461 A | 2/1999 | Lindholm .................... | 711/811 |
| 5,961,584 A * | 10/1999 | Wolf ........................... | 718/103 |
| 6,167,424 A * | 12/2000 | Bak et al. .................... | 718/100 |
| 6,477,559 B1 * | 11/2002 | Veluvali et al. .............. | 718/101 |
| 6,735,770 B1 * | 5/2004 | Yeager et al. ................ | 718/107 |

OTHER PUBLICATIONS

"An Efficient Meta–Lock for Implementing Ubiquitous Synchronization", Oct. 1999, Ole Agesen et al. Sun Microsystems Laboratories.*

"Thin Locks: Featheweight Synchronization for JAVA", David F. Bacon et al. IBM, 1998.*

"JAVA Threads", Scott Oaks & Henry Wong, $2^{nd}$ Edition, 1999.*

"An Efficient Meta–lock for Implementing Ubiquitous Synchronization", Agesen et al., OOPSLA'99, Nov. 1999, Denver CO, pp 207–221.

"Monitors and Exceptions: How to implement JAVA efficiently", A. Krall and M. Probst, Institut für Computersprachen, XP–002238141, 10 Pages.

International Search Report from corresponding PCT application PCT/US01/15862, mailed May 7, 2003.

* cited by examiner

Primary Examiner—Maid A. Banankhah
(74) Attorney, Agent, or Firm—Beyer Weaver & Thomas, LLP (57) ABSTRACT

Methods and apparatus for enabling the association between a monitor and an object to be maintained when a garbage collection occurs during a wait action performed with respect to the object are disclosed. According to one aspect of the present invention, a method for acquiring access to an object in a multi-threaded, object-based system includes associating a monitor with the object, and setting a pointer from a thread, which is arranged to execute on the object, to the object. The method also includes setting a reference substantially directly from the thread to the monitor. In one embodiment, setting the reference includes setting a boolean reference count. In another embodiment, setting the reference enables a garbage collector to determine whether the monitor is suitable for reclamation during a garbage collection process.

19 Claims, 8 Drawing Sheets

METHOD AND APPARATUS FOR EFFICIENTLY TRACKING MONITORS

CROSS REFERENCE TO RELATED APPLICATION

The present invention claims priority of provisional U.S. patent application Ser. No. 60/208,025, filed May 30, 2000, which is incorporated herein by reference in its entirety.

BACKGROUND OF THE INVENTION

1. Field of Invention

The present invention relates generally to methods and apparatus for synchronization within a multi-threaded, object-based system. More particularly, the present invention relates to methods and apparatus for preventing monitors from being reclaimed during a garbage collection process when it is desired for the monitors to remain associated with their respective objects.

2. Description of the Related Art

An object that is suitable for use in an object-based environment generally includes a set of operations and a state that effectively remembers the effect of the operations. Since an object has at least some memory capability, an object differs from a function, which has substantially no memory capability. For example, a value returned by an operation associated with an object is dependent upon the state of the object as well as the arguments to the operation. As such, each invocation of an object may have a different result. In contrast, a value returned by a function is typically dependent only on the arguments to the function.

Within an object-based environment, threads are often used to satisfy requests for services. A thread may be thought of as a "sketch pad" of storage resources, and is essentially a single sequential flow of control within a computer program. In general, a thread, or a "thread of control," is a sequence of central processing unit (CPU) instructions or programming language statements that may be independently executed. Each thread has its own execution stack on which method activations reside. As will be appreciated by those skilled in the art, when a method is activated with respect to a thread, an activation is "pushed" on the execution stack of the thread. When the method returns, or is deactivated, the activation is "popped" from the execution stack. Since an activation of one method may activate another method, an execution stack operates in a first-in-last-out manner.

In some object-based environments, only one thread is allowed to invoke one of some number of operations, i.e., synchronized operations, that involve a particular object at any given time. Synchronization constructs such as locks, mutexes, semaphores, and monitors are often used to control access to shared resources, e.g., objects, such that only a single thread may invoke operations on a shared object at any given time.

In some virtual machines, when a thread wants to execute statements which require access to an object, the thread acquires a monitor associated with the object. A monitor, as will be understood by those skilled in the art, is a mechanism which is arranged to enable one thread at a time to execute a specific region of code. Hence, a monitor may be considered to be a type of lock.

Figure 1:
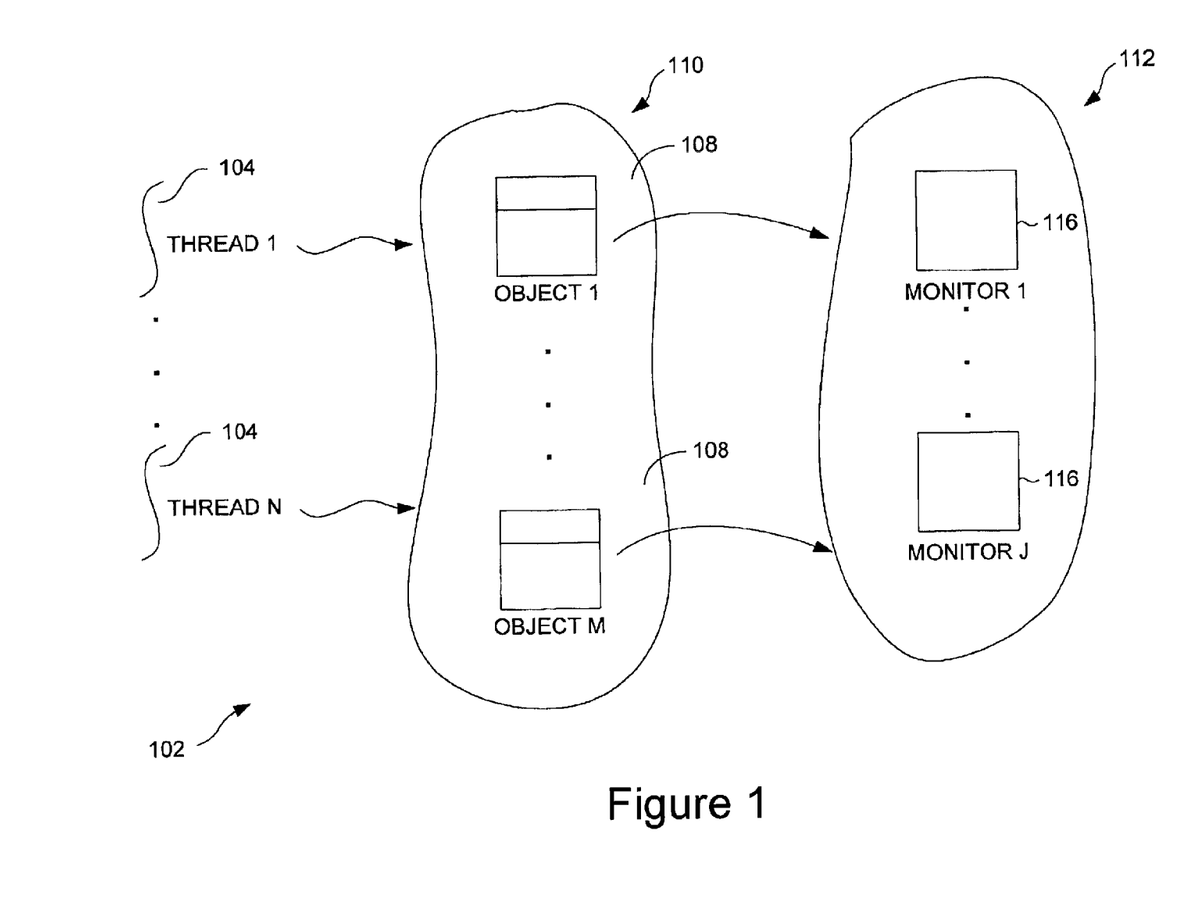
FIG. 1 is a diagrammatic representation of an object-based system with threads, objects, and a freelist of monitors.

FIG. 1 is a diagrammatic representation of a multi-threaded, object-based system which includes threads, objects, and monitors. Within an object-based system 102, threads 104 may attempt to acquire, or lock, an object 108.

In many systems, objects 108 are shared objects in that objects 108 may be part of a pool 110 of objects 108, stored on an object heap, that different threads 104 may attempt to access. In general, system 102 includes a freelist 112 of monitors 116 which is arranged to be shared, e.g., shared system-wide. Monitors 116, however, may either be global or thread-based. Freelist 112 is such that an object 108 may access freelist 112 to obtain a monitor 116. That is, object 108 uses freelist 112 to locate a suitable monitor 116 to associate with itself.

In a system which uses a set of monitors for a set of objects which is larger than the set of monitors, an object is typically associated with a monitor only when the object is alive or active. In other words, if an object is not being used by a thread, then the object does not need an associated monitor. If no objects reference a given monitor, then that monitor may effectively be reused, e.g., by another object. Since monitors are shared resources, disassociating effectively unused monitors from objects enables the resources associated with a computing system to be used more efficiently. The efficient use of resources, further, may lead to improved performance of the computing system.

Figure 2A:
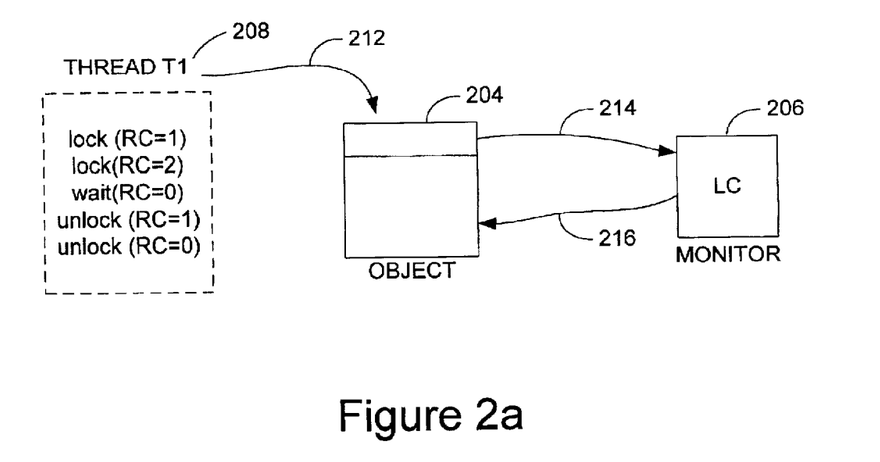
FIG. 2a is a diagrammatic representation of thread which is operating on an object which has an associated monitor.

Referring next to FIG. 2a, the associations between a thread, an object, and an associated monitor will be described. An object 204 has an associated monitor 206, which typically becomes associated with object 204 when a thread 208 acquires access to object 204. Thread 208 includes a reference 212, e.g., a pointer, to object 204 which, in turn, includes a link 214 or a reference to monitor 206. Monitor 206 includes its own link 216 or pointer to object 204. While the configuration of reference 212 and links 214, 216 may vary, reference 212 and links 214, 216 are often contents within a particular field of thread 208, object 204, and monitor 206, respectively. It should be appreciated that a field within monitor 206 which contains link 216 may be considered to be an object reference field.

Thread 208 includes a reference count (RC) which tracks the number of times thread 208 locks object 204 and, hence, "enters" monitor 206. Similarly, monitor 206 includes a lock count (LC) which is effectively the same as the reference count of thread 208. Thread 208 may generally execute a lock action, an unlock action, and a wait action. When thread 208 executes a lock action, thread 208 effectively acquire a claim on a lock (not shown) that is associated with object 204, and the reference count of thread 208 is incremented. An unlock action causes thread 208 to release a claim on the lock that is associated with object 204, and the reference count of thread 208 is decremented. During a wait action, the reference count of thread 208 is effectively temporarily set to zero, and the lock associated with object 204 effectively has no owner. A wait action such as an object wait operation in a Java™ programming environment developed by Sun Microsystems, Inc., of Palo Alto, Calif., generally causes an object to be unlocked, and may be executed to enable thread 208 to acquire access to another object and monitor (not shown). Once the wait action terminates, then the reference count of thread 208 is typically restored to a value it had prior to the wait state.

Figure 2B:
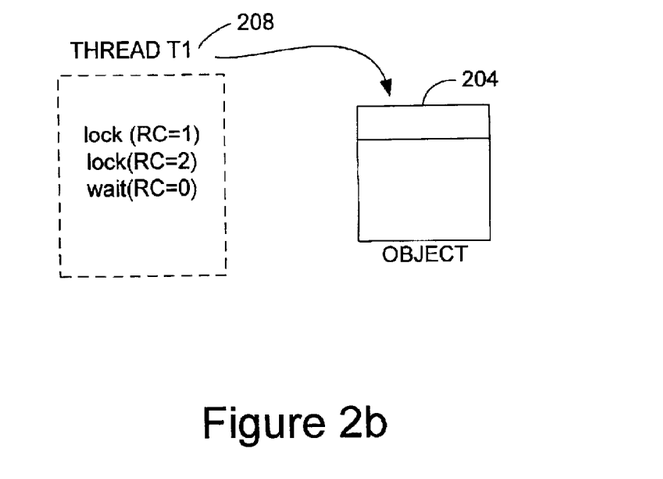

When object 204 is considered as having no owner, then monitor 206 may be reclaimed. That is, when monitor 206 has a lock count of zero and is considered as not being in use, monitor 206 may be reclaimed such that monitor 206 may become associated with another object. In the event that monitor 206 is reclaimed during a wait action, object 204 would no longer include a reference to monitor 206, as shown in FIG. 2b. If monitor 206, as shown in FIG. 2a, is reclaimed by a garbage collection during a wait action, then thread 208 will still require access to object 204 and, hence, a monitor after the wait action concludes. Newly associating a monitor with object 204 and, hence, thread 208 after a wait action is often expensive, as allocating synchronization constructs such as monitors may be time-consuming.

A monitor is generally subject to a garbage collection process because a monitor may contain a pointer to an object, e.g., link 216 of FIG. 2a. Since objects are routinely moved within memory space during a garbage collection, a garbage collector studies monitors because the pointers from monitors to objects may need to be updated to account for a move object. It should be appreciated that "reclaiming a monitor" generally includes removing pointers or links between the monitor and its associated object.

The reclamation of a monitor when a thread is in the midst of "using" an object and the monitor, e.g., during a wait action, is inefficient since the thread and the object would need an associated monitor as soon as the wait action concludes. The reassociation of a monitor with the thread and the object may be avoided if the original monitor is somehow kept associated with the object and the thread during the wait operation, even if a garbage collection process occurs during the wait operation. In other words, preventing a garbage collection process from reclaiming a monitor which has a lock count of zero due to an associated wait operation would effectively eliminate issues associated with having to reassociate a monitor with an object and a thread.

In addition, a system may require that a monitor not be reclaimed in order for the system to operate correctly. By way of example, when a thread waits on a monitor, the thread needs to be woken up when another thread performs a notify on that monitor. The wait operation may have changed the state of the monitor or the thread so that they are associated with each other. In such a case, it is important that the monitor not be used for another purpose until the wait operation has been completed, as the monitor is effectively still being used while the associated lock count is zero.

In order to prevent a monitor from being reclaimed during a wait operation or a similar operation, a counter is often set within the monitor that is only incremented when a claim to its associated object is made, and decremented when the claim is released. Such a counter would not be reset to zero during a wait action. While such a counter may effectively prevent a monitor from being reclaimed if a garbage collection occurs during a wait action, counters are often expensive to implement. For example, in a multi-threaded environment, reference counts may be expensive to implement without hardware support, like an atomic increment instruction.

A general system pointer may also be set to identify the monitor as being in use even if its lock count is zero. In other words, a monitor has a reference so that a garbage collector can find it. Such a reference may be a general system pointer, or an index into a table. In general, each reference to a monitor has only one thread that can modify it such that no additional locking or atomic operations are needed to lock the modify the monitor. The general system pointer may be studied by a garbage collector to identify the monitor as being in use, thereby preventing the monitor from being reclaimed. It should be appreciated, however, that while using a system pointer may be effective to prevent a monitor from being reclaimed, such a system pointer is expensive to implement, as it requires significant overhead.

Therefore, what is needed is an efficient method and apparatus for preventing monitors from being reclaimed during a wait operation. That is, what is desired is an inexpensive method for enabling a monitor to remain associated with an object during a garbage collection which occurs during a wait action or other similar action associated with the monitor.

SUMMARY OF THE INVENTION

The present invention relates to methods and apparatus for enabling the association between a monitor and an object to be maintained when a garbage collection occurs during a wait action performed with respect to the object. According to one aspect of the present invention, a method for acquiring access to an object in a multi-threaded, object-based system includes associating a monitor with the object, and setting a pointer from a thread, which is arranged to execute on the object, to the object. The method also includes setting a reference substantially directly from the thread to the monitor. In one embodiment, setting the reference includes setting a boolean reference count.

According to another aspect of the present invention, a method for reducing overhead associated with providing a monitor for an object included in a multi-threaded, object-based computing system that has a plurality of monitors includes setting a pointer from the first monitor to the object and setting a pointer from the object back to the first monitor. A pointer is also set from a thread to the object. Finally, a reference from the thread substantially directly to the first monitor is set by updating contents of a reference field associated with the thread.

In one embodiment, the method also includes invoking the object using the thread. Invoking the object using the thread may include initiating a wait action that is arranged to place the object into a wait state. In such an embodiment, a memory reclamation may be performed during the wait state. When a memory reclamation, e.g., a garbage collection, is performed, the memory reclamation includes identifying the contents of the reference field, using the contents of the reference field to identify the first monitor, and updating the contents of a monitor field associated with the first monitor to indicate that the first monitor is in use. Hence, during a scanning process, the first monitor is identified as being in use via the contents of the monitor field, and is not reclaimed.

Preventing the first monitor from being reclaimed during a garbage collection effectively eliminates the need to reassociate either the first monitor or a different monitor with the object once the wait state ends. As associating monitors with objects may require a relatively significant amount of overhead, reducing the need to associate monitors with objects enables the computing system to execute more efficiently.

According to still another aspect of the present invention, a multi-threaded, object-based computing system includes at least one object and a monitor freelist that includes at least one monitor. The system also includes at least one thread. A thread includes a reference to an object and a reference to a monitor, while the object and the monitor each also include references to each other. The reference from the thread to the monitor enables the monitor to be substantially directly identified by the thread.

These and other advantages of the present invention will become apparent upon reading the following detailed descriptions and studying the various figures of the drawings.

BRIEF DESCRIPTION OF THE DRAWINGS

The invention may best be understood by reference to the following description taken in conjunction with the accompanying drawings in which:

FIG. 2b is a diagrammatic representation of a thread, i.e., thread 208 of FIG. 2a, in a wait state with respect to an object, i.e., object 204 of FIG. 2a.

DETAILED DESCRIPTION OF THE EMBODIMENTS

The reclamation of a monitor when a thread is in the midst of a wait action with respect to the monitor and its associated object results in the need to associate either the same monitor or a different monitor with the object as soon as the wait action concludes. Reassociating a monitor with the object may be avoided if the original monitor is kept associated with the object during a garbage collection process that occurs during the wait operation. Specifically, preventing a garbage collection process from reclaiming a monitor which is effectively still needed would improve the overall efficiency of an object-based system by eliminating the overhead associated with providing either a new monitor or a different monitor for use with the object once a monitor is once again needed.

By marking a monitor which is associated with an object as being in use even while a wait action is occurring, references from the monitor to the object may be prevented from being removed. That is, the monitor may be prevented from being reclaimed by a garbage collector. In one embodiment, when a thread locks an object, the thread sets a pointer or a reference to the monitor. When a garbage collection is about to occur, a garbage collector may, in addition to tracking roots through computer memory, iterate through the threads associated with the overall system to identify threads which point to monitors. The monitors identified by the threads may then be marked to indicate that they are "busy," or in use, even if their associated lock counts indicate otherwise. When a monitor is identified as being in use, the garbage collector may bypass that monitor and, therefore, not reclaim the monitor. Hence, the monitor is allowed to remain associated with an object.

The implementation of a reference pointer from a thread to a monitor is possible because a thread may only perform a wait action or similar action, e.g., a monitor wait, for a single monitor at a time. Implementing a reference pointer from a thread to a monitor is generally relatively inexpensive, in comparison with implementing a reference count in the monitor or setting a general reference pointer to the monitor. While a garbage collection process which iterates through threads and marks monitors as busy may require more overhead than a standard garbage collection process, the savings on the overhead associated with associating monitors with objects compensates for the increase in overhead associated with garbage collection. Further, as garbage collection happens rarely, the increase in overhead associated with garbage collection may not be as significant as the increase in efficiency with regards to monitor operations.

Figure 3A:
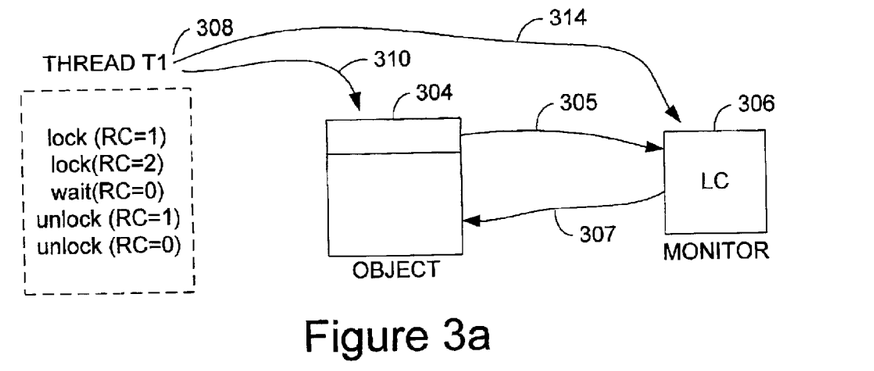
FIG. 3a is a diagrammatic representation of thread which is operating on an object which has an associated monitor in accordance with an embodiment of the present invention.

FIG. 3a is a diagrammatic representation of thread which is operating on an object which has an associated monitor in accordance with an embodiment of the present invention. As shown, and object 304 has a pointer 305 to a monitor 306, while monitor 306 has a pointer 307 to object 304. Typically, both pointers 305, 307 are set when object 304 associates itself with monitor 306, e.g., when a thread 308 locks object 304. During a garbage collection, if monitor 306 is being reclaimed, then pointers 305, 307 are effectively removed. In the described embodiment, when thread 308 locks object 304, thread 308 sets a pointer 310 to object 304. Pointer 310 is arranged to identify object 304 as being associated with thread 308. In general, when thread 308 relinquishes control of object 304, e.g., completely unlocks object 304, then pointer 310 is effectively removed.

Figure 3B:
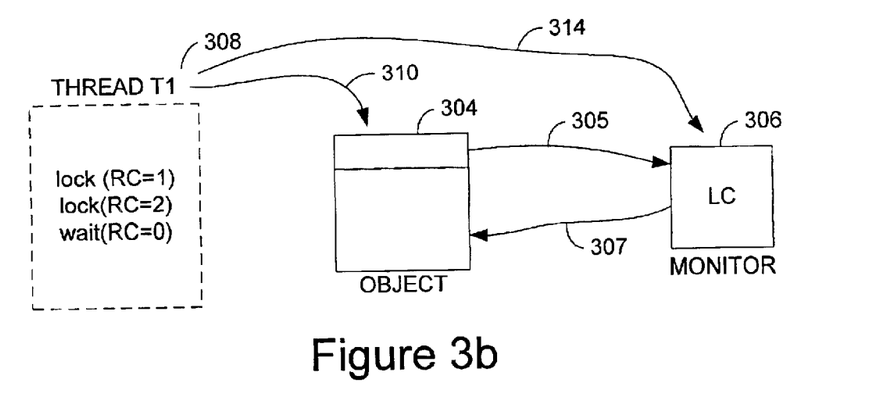
FIG. 3b is a diagrammatic representation of a thread, i.e., thread 308 of FIG. 3a, performing a wait operation with respect to an object, i.e., object 304 of FIG. 3a, in accordance with an embodiment of the present invention.

Thread 308 also includes a reference field which references monitor 306. By way of example, thread 308 may have a pointer 314 to monitor 306. Pointer 314 to monitor 306 is arranged to remain set at least until thread 308 completely unlocks object 304. When thread 308 performs a wait action that causes a reference count (RC) within thread 308, as well as a corresponding lock count (LC) within monitor 306, to be set to a value of zero, pointer 314 remains set. FIG. 3b is a diagrammatic representation of a thread, i.e., thread 308 of FIG. 3a, performs a wait action with respect to an object, i.e., object 304 of FIG. 3a, in accordance with an embodiment of the present invention. Maintaining pointer 314 through a wait action enables a garbage collector to identify monitor 306 as being in use, as will be described below with respect to FIGS. 5a–c. Accordingly, monitor 306 is prevented from being reclaimed by the garbage collector during a wait action, and maintains its associations with object 304 and thread 308.

Figure 3C:
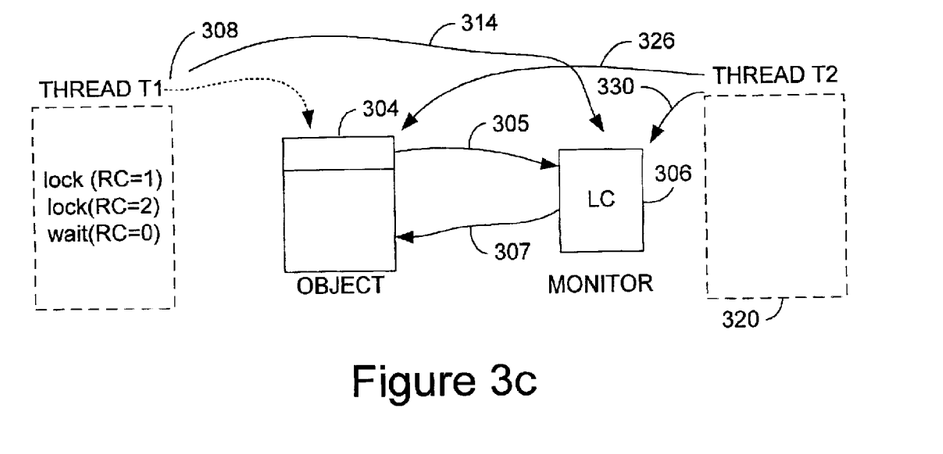
FIG. 3c is a diagrammatic representation of a thread, i.e., thread 308 of FIG. 3a, performing a wait operation with respect to an object, i.e., object 304 of FIG. 3a, after another thread has accessed the object, i.e., object 304 of FIG. 3a, in accordance with an embodiment of the present invention.

In general, thread 308 may only reference one monitor, i.e., monitor 306. Monitor 306, however, while being associated with only one object, i.e., object 304, at a time, may be referenced by more than one thread at any given time. FIG. 3c is a diagrammatic representation of a thread, i.e., thread 308 of FIG. 3a, in a wait state with respect to an object, i.e., object 304 of FIG. 3a, after another thread has accessed the object, i.e., object 304 of FIG. 3a, in accordance with an embodiment of the present invention. While a wait action is initiated by thread 308, the lock count of monitor 306 has a value that indicates that monitor 306 is effectively not in use. As described above, when a garbage collection occurs, monitor 306 may be marked as being in use to prevent monitor 306 from being reclaimed. However, when there is not garbage collection during the wait action, object 304 and monitor 306 may be accessed by another thread, e.g., thread 320. When thread 320 acquire access to object 304 and monitor 306, thread 320 may set a pointer 326 to object 304, as well as a reference pointer 330 to monitor 306. Hence, thread 320 is allowed to invoke upon object 304 while a wait action is in progress with respect to thread 308.

Figure 4:
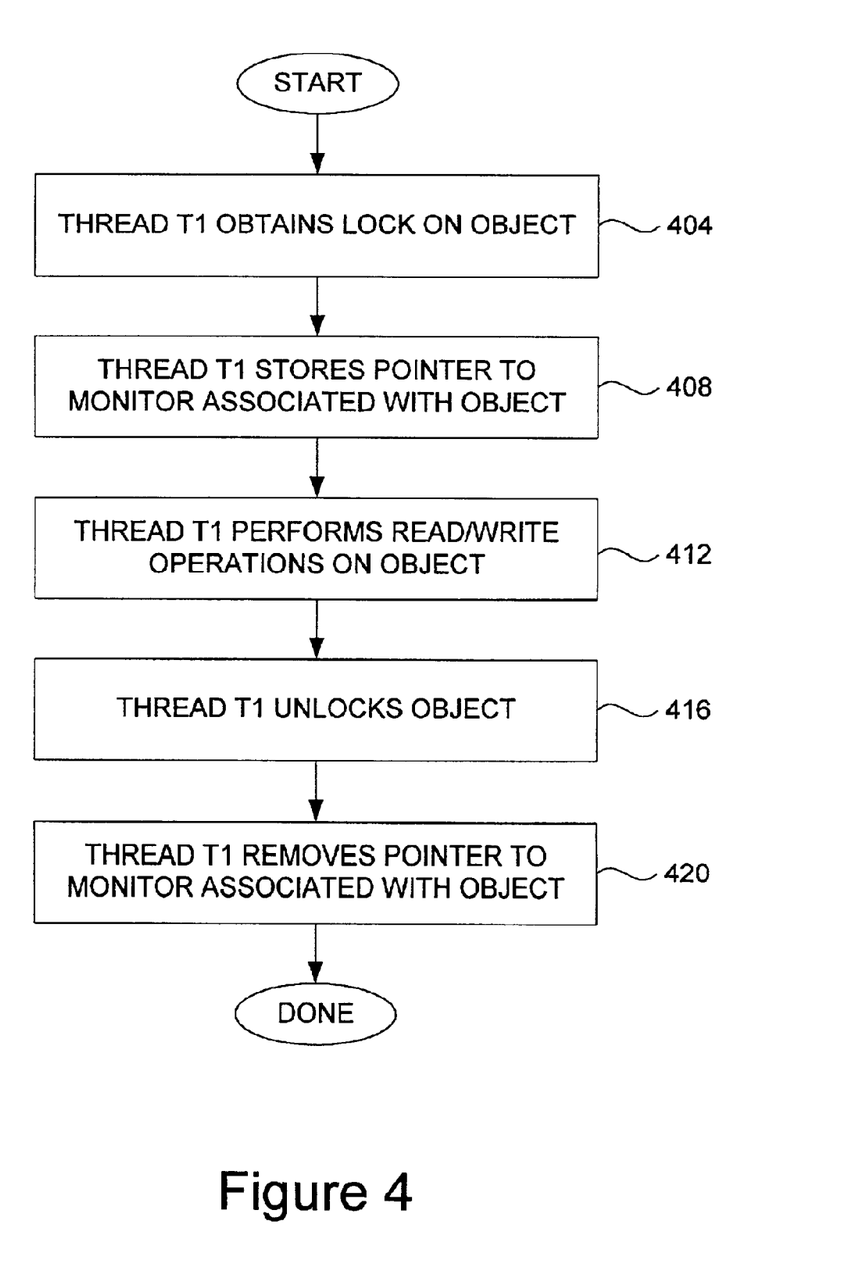
FIG. 4 is a process flow diagram which illustrates the steps associated with acquiring access to and operating on an object using a monitor reference from a thread in accordance with an embodiment of the present invention.

With reference to FIG. 4, the steps associated with a thread acquiring access to and operating on an object will be described in accordance with an embodiment of the present invention. The process begins at step 404 in which a thread T1 obtains the lock on an object which has an associated monitor. When thread T1 obtains a lock on an object, if the object does not have an associated lock, the object obtains a lock which thread TI may use to lock the object. Similarly, if the object does not have an associated monitor, then the object obtains a monitor. In one embodiment, when a virtual machine associated with the thread is a Java™ virtual machine developed by Sun Microsystems, Inc. of Palo Alto, Calif., then any object which thread T1 acquires either has or will have an associated monitor before thread T1 may execute statements in a synchronized block.

Once thread T1 acquires the lock on the object in step 404, thread T1 stores a pointer to the monitor associated with the object in step 408. As previously described, thread T1 may set an effective boolean reference count within itself, e.g., in a reference field, that references the monitor. Specifically, a reference from a thread may be considered to be a boolean reference count because it signifies that a single thread is referencing the monitor. After thread T1 stores a pointer to the monitor, thread T1 proceeds to operate on the object in step 408. Operating on the object may include, but is not limited to, reading information from and writing information to the object.

When thread T1 has completed its operations on the object, then in step 416, thread T2 unlocks the object. In other words, thread T1 releases the lock on the object in order to enable other threads to acquire access to the object. From step 416, process flow moves to step 420 in which thread T1 removes its pointer to the monitor associated with the object. In one embodiment, thread T1 may effectively reset a boolean reference count within itself to effectively disassociate itself from the monitor. Once thread T1 disassociates itself from the monitor, the monitor may then be added to or returned to a freelist of monitors, and the process of acquiring access to an operating on an object is completed.

As mentioned above, the reference from a thread substantially directly to a monitor may prevent the monitor from being reclaimed during a wait operation. Alternatively, the entry count on the monitor may be what the garbage collector uses to determine that a monitor is busy. Although the steps associated with a garbage collection, or resource reclamation process, may vary widely, it should be understood that the garbage collection generally includes following roots through a heap or heaps to identified unused objects, and reclaiming the unused objects. In one embodiment, a garbage collection would also study threads and identify monitor reference fields within the threads.

Figure 5A:
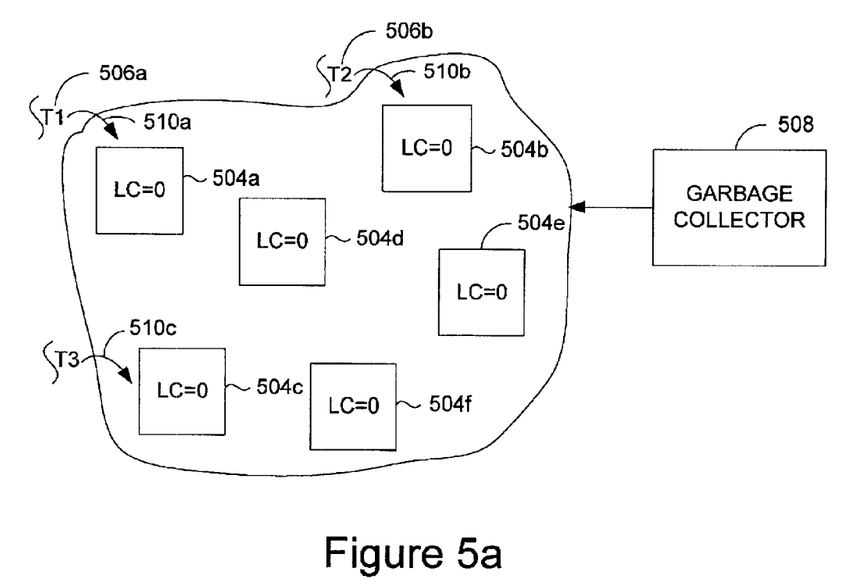
FIG. 5a is a diagrammatic representation of monitors which are to be processed by a garbage collector in accordance with an embodiment of the present invention.
Figure 5B:
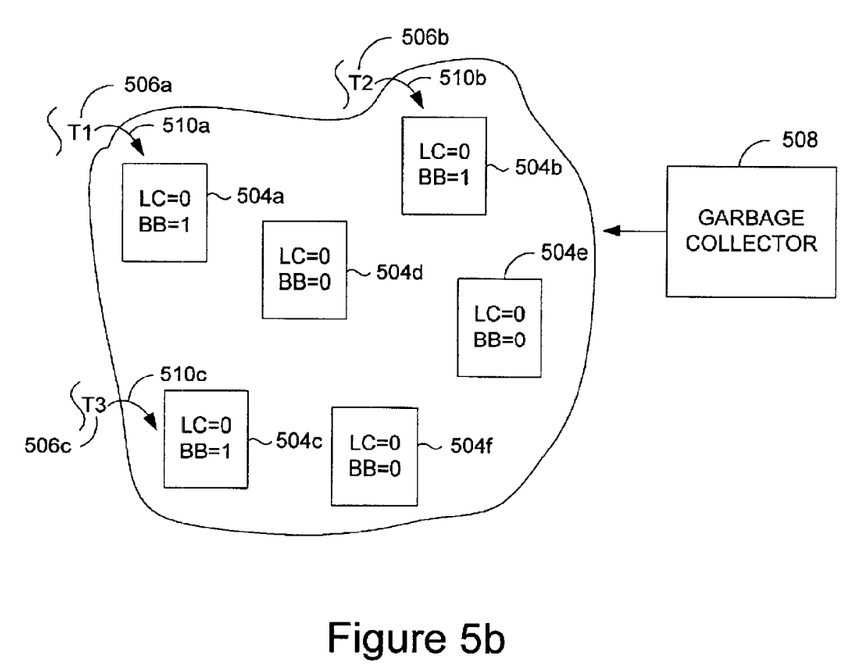
FIG. 5b is a diagrammatic representation of monitors, i.e., monitors 504 of FIG. 5a, after the monitors are studied by a garbage collector, i.e., garbage collector 508 of FIG. 5a, in accordance with an embodiment of the present invention.
Figure 5C:
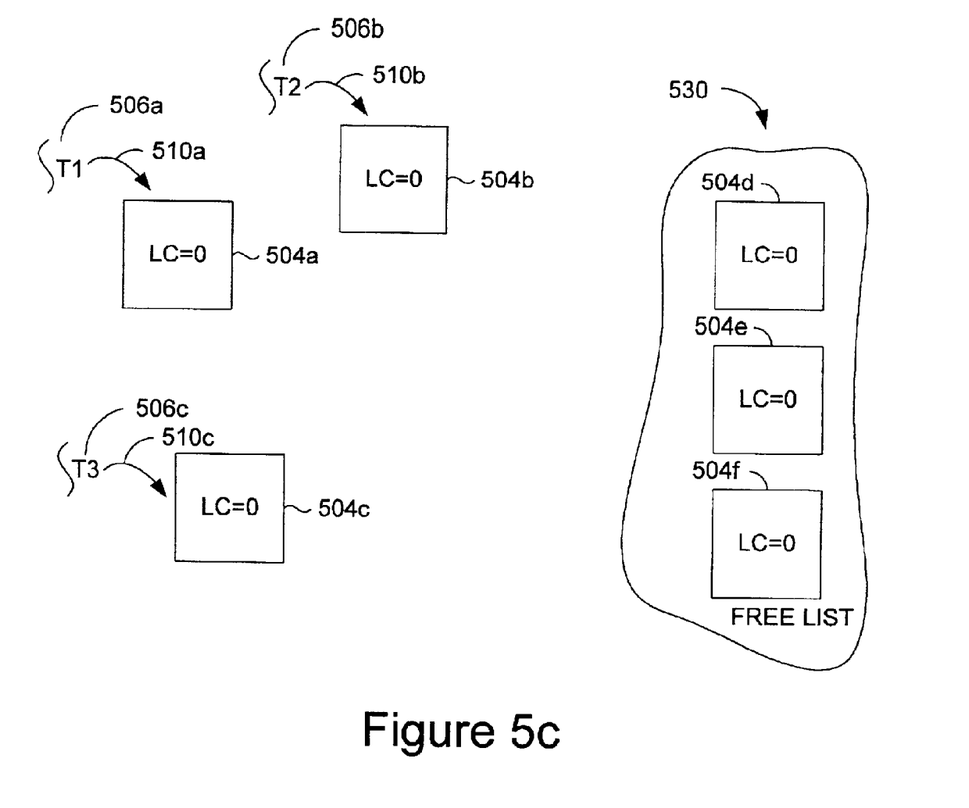
FIG. 5c is a diagrammatic representation of monitors, i.e., monitors 504 of FIG. 5a, after a garbage collection in accordance with an embodiment of the present invention.

With reference to FIGS. 5a–c, the general operation of a garbage collector on memory which includes monitors that are referenced substantially directly from threads will be described. FIG. 5a is a diagrammatic representation of monitors which are to be processed by a garbage collector in accordance with an embodiment of the present invention. Monitors 504 which may be suitable for being collected by a garbage collection by a garbage collector 508 have lock counts of zero, as shown. It should be appreciated that monitors 504 may be located on an object heap, although monitors 504 may be located substantially anywhere within a system. A lock count of zero indicates, as described above, that a monitor is either not associated with a locked object or that a monitor is associated with a thread which is performing a monitor wait. Monitors 504 which are not associated with a locked object may be reclaimed, while it is desirable for monitors 504 on which monitor waits are being performed to not be reclaimed, for efficiency. In one embodiment, preventing monitors 504 on which monitor waits are being performed substantially eliminates the need to reallocate a monitor to an object and, hence, a thread when the monitor wait ends.

Monitors 504a–c have lock counts of zero, but are associated with threads 506a–c, respectively. That is, monitors 504a–c are pointed to or otherwise referenced by threads 506a–c, respectively. Monitors 504d–f, alternatively, have lock counts of zero, but are not referenced by threads.

When garbage collector 508 begins a reclamation process, garbage collector 508 scans through threads in a given system to determine if threads 506 include any references 510 to monitors 504. Upon locating threads 506 with references 510 to monitors 504, garbage collector 508 may mark the corresponding monitors 504, e.g., monitors 504a–c, to indicate that monitors 504a–c are "busy," or should not be reclaimed for reallocation. FIG. 5b shows monitors 504a–c after monitors 504a–c have been marked as being busy. Although monitors 504d–f may be marked as being busy using substantially any suitable method, in one embodiment, a busy bit (BB) within each monitor 504a–c is set to indicate that each monitor 504a–c is busy, e.g., is referenced by at least one thread 506. As mentioned above, a monitor 504 may be referenced by more than one thread 506, but each thread 506 may reference substantially only a single monitor 504. For monitors 504 which are not referenced by threads 506, namely monitors 504d–f, corresponding busy bits may be set to indicate that monitors 504d–f are not busy.

After a busy bit within each referenced monitor 504da–c is set, then garbage collector 508 may proceed with a garbage collection process, and reclaim memory space within memory heaps of a system. It should be understood that the garbage collection process that is used may be substantially any suitable garbage collection process that is arranged to identify whether the busy bit of a monitor 504 is set to indicate that the monitor 504 is referenced by a thread 506. Any monitor 504 that has a busy bit set to indicate that the monitor is busy, e.g., any one of monitors 504a–c, is not reclaimed, or otherwise disassociated from a corresponding object (not shown). By not reclaiming monitors 504a–c, monitors 504a–c are allowed to maintain their associations with their respective objects (not shown), and the need to associate new monitors with the objects once wait actions are completed may be eliminated.

FIG. 5c is a diagrammatic representation of monitors, i.e., monitors 504 of FIG. 5a, after a garbage collection in accordance with an embodiment of the present invention. After a garbage collection, any monitors 504 which were not referenced by a thread 506 or had busy bits set to indicate that the monitors 504 were not busy are effectively freed. In one embodiment, such monitors 504, e.g., monitors 504d–f, are added to a freelist 530 of monitors 504 that an object (not shown) may access to obtain a monitor 504 for itself.

Monitors 504a–c, or "busy" monitors, remain associated with their respective threads 506a–c and objects (not shown) after garbage collection. It should be appreciated that a garbage collection process may cause busy bits to be reset, e.g., set to zero to indicate a default "unbusy" status, at the end of the process. Alternatively, such busy bits may be cleared at the beginning of a subsequent garbage collection process.

Figure 6:
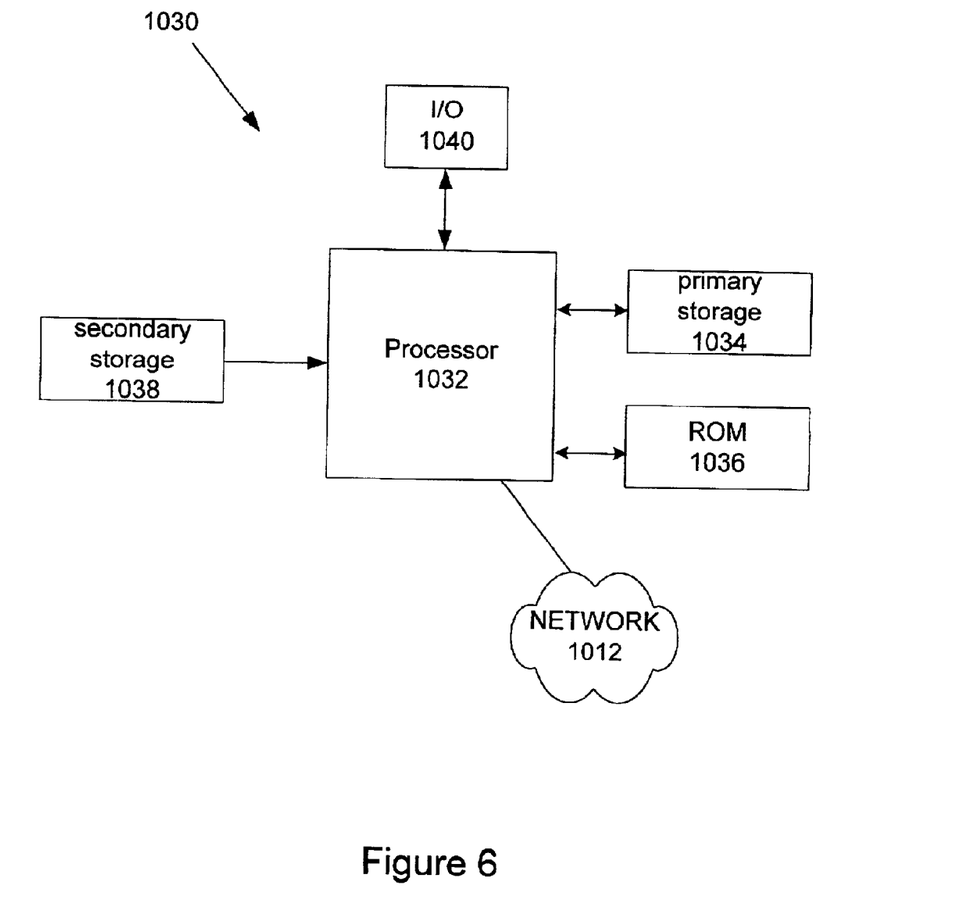
FIG. 6 is a diagrammatic representation of a general-purpose computer system suitable for implementing the present invention.

FIG. 6 illustrates a typical, general-purpose computer system suitable for implementing the present invention. The computer system 1030 includes at least one processor 1032 (also referred to as a central processing unit, or CPU) that is coupled to memory devices including primary storage devices 1036 (typically a read only memory, or ROM) and primary storage devices 1034 (typically a random access memory, or RAM).

Computer system 1030 or, more specifically, CPUs 1032, may be arranged to support a virtual machine, as will be appreciated by those skilled in the art. One example of a virtual machine that may be supported on computer system 1030 will be described below with reference to FIG. 7. As is well known in the art, ROM acts to transfer data and instructions uni-directionally to the CPUs 1032, while RAM is used typically to transfer data and instructions in a bi-directional manner. CPUs 1032 may generally include any number of processors. Both primary storage devices 1034, 1036 may include any suitable computer-readable media. A secondary storage medium 1038, which is typically a mass memory device, is also coupled bi-directionally to CPUs 1032 and provides additional data storage capacity. The mass memory device 1038 is a computer-readable medium that may be used to store programs including computer code, data, and the like. Typically, mass memory device 1038 is a storage medium such as a hard disk or a tape which generally slower than primary storage devices 1034, 1036. Mass memory storage device 1038 may take the form of a magnetic or paper tape reader or some other well-known device. It will be appreciated that the information retained within the mass memory device 1038, may, in appropriate cases, be incorporated in standard fashion as part of RAM 1036 as virtual memory. A specific primary storage device 1034 such as a CD-ROM may also pass data uni-directionally to the CPUs 1032.

CPUs 1032 are also coupled to one or more input/output devices 1040 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPUs 1032 optionally may be coupled to a computer or telecommunications network, e.g., an internet network or an intranet network, using a network connection as shown generally at 1012. With such a network connection, it is contemplated that the CPUs 1032 might receive information from the network, or might output information to the network in the course of performing the above-described method steps. Such information, which is often represented as a sequence of instructions to be executed using CPUs 1032, may be received from and outputted to the network, for example, in the form of a computer data signal embodied in a carrier wave. The above-described devices and materials will be familiar to those of skill in the computer hardware and software arts.

Figure 7:
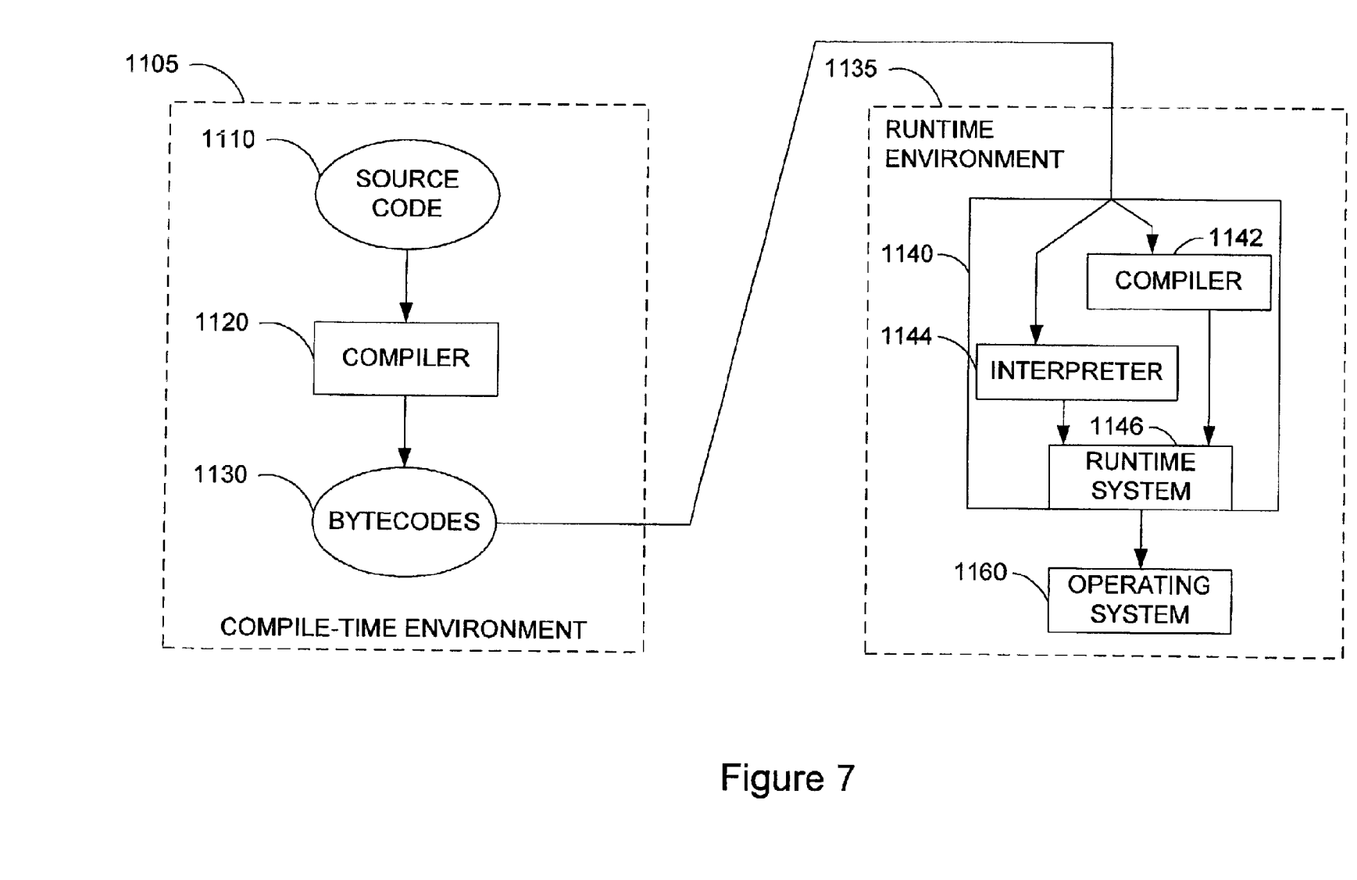
FIG. 7 is a diagrammatic representation of a virtual machine suitable for implementing the present invention.

As previously mentioned, a virtual machine may execute on computer system 1030. FIG. 7 is a diagrammatic representation of a virtual machine which is supported by computer system 1030 of FIG. 6, and is suitable for implementing the present invention. When a computer program, e.g., a computer program written in the Java™ programming language, is executed, source code 1110 is provided to a compiler 1120 within compile-time environment 1105. Compiler 1120 translates source code 1110 into bytecodes 1130. In general, source code 1110 is translated into bytecodes 1130 at the time source code 1110 is created by a software developer.

Bytecodes 1130 may generally be reproduced, downloaded, or otherwise distributed through a network, e.g., network 1012 of FIG. 6, or stored on a storage device such as primary storage 1034 of FIG. 6. In the described embodiment, bytecodes 1130 are platform independent. That is, bytecodes 1130 may be executed on substantially any computer system that is running on a suitable virtual machine 1140.

Bytecodes 1130 are provided to a runtime environment 1135 which includes virtual machine 1140. Runtime environment 1135 may generally be executed using a processor or processors such as CPUs 1032 of FIG. 6. Virtual machine 1140 includes a compiler 1142, an interpreter 1144, and a runtime system 1146. Bytecodes 1130 may be provided either to compiler 1142 or interpreter 1144.

When bytecodes 1130 are provided to compiler 1142, methods contained in bytecodes 1130 are compiled into machine instructions. In one embodiment, compiler 1142 is a just-in-time compiler which delays the compilation of methods contained in bytecodes 1130 until the methods are about to be executed. When bytecodes 1130 are provided to interpreter 1144, bytecodes 1130 are read into interpreter 1144 one bytecode at a time. Interpreter 1144 then performs the operation defined by each bytecode as each bytecode is read into interpreter 1144. That is, interpreter 1144 "interprets" bytecodes 1130, as will be appreciated by those skilled in the art. In general, interpreter 1144 processes bytecodes 1130 and performs operations associated with bytecodes 1130 substantially continuously.

When a method is invoked by another method, or is invoked from runtime environment 1135, if the method is interpreted, runtime system 1146 may obtain the method from runtime environment 1135 in the form of a sequence of bytecodes 1130, which may be directly executed by interpreter 1144. If, on the other hand, the method which is invoked is a compiled method which has not been compiled, runtime system 1146 also obtains the method from runtime environment 1135 in the form of a sequence of bytecodes 1130, then may go on to activate compiler 1142. Compiler 1142 then generates machine instructions from bytecodes 1130, and the resulting machine-language instructions may be executed directly by CPUs 1032. In general, the machine-language instructions are discarded when virtual machine 1140 terminates. The operation of virtual machines or, more particularly, Java™ virtual machines, is described in more detail in *The Java™ Virtual Machine Specification* by Tim Lindholm and Frank Yellin (ISBN 0-201-63452-X), which is incorporated herein by reference.

Although only a few embodiments of the present invention have been described, it should be understood that the present invention may be embodied in many other specific forms without departing from the spirit or the scope of the present invention. By way of example, the present invention has been described in terms of implementing a pointer from a thread to a monitor. Alternatively, monitor may also be set to include a reference to a thread that locks the object associated with the monitor. The reference may be set when the thread obtains an associated object lock. The use of such a pointer may also be effective in preventing the reclamation of a monitor during a garbage collection which occurs during a wait action, and may eliminate the need to set a busy bit in the monitor during the garbage collection. Instead, a garbage collector may search for a pointer that references a thread from a monitor. Such a reference may be explicitly cleared when the thread ultimately releases an associated object.

While the use of a pointer from a thread to a monitor prevents the monitor from being reclaimed should a garbage collection occur during a wait action, it should be understood that the use of such a pointer may also prevent the monitor from being reclaimed after an associated object has been unlocked. For instance, if a first thread has a reference to a monitor that is associated with an object and a second thread attempts to access the object and sees that the object is already locked by the first thread, then the second thread will typically either block itself or spin until the object and the monitor become available. As soon as the object is unlocked, if the second thread acquires access to the object before the first thread has an opportunity to remove its pointer to the monitor, then the monitor remains associated with the object. Hence, the overhead associated with the object acquiring a monitor may be avoided.

A wait action is only one example of an operation that may benefit from a monitor being marked as not reclaimable. It should be appreciated that other situations may arise, e.g., during a garbage collection or otherwise, in which it may be desirable to prevent reclamation of a monitor.

A garbage collection process has been described as clearing a busy bit within a monitor at the end of the process. It should be appreciated, however, that in lieu of clearing a busy bit at the end of the process, the busy bit may be cleared at the beginning of the garbage collection process. Alternatively, an assumption may be made during garbage collection that the busy bit is substantially always cleared prior to garbage collection, e.g., is cleared by a thread when the thread disassociates itself from the monitor. In one embodiment, rather than clearing the busy bit, a garbage collector may track the busy bits it has just marked. For example, when the garbage collector identifies a monitor as being busy, the garbage collector may set the busy bit in the monitor to indicate that the monitor is busy, and set an identifier to identify the monitor as being associated with a busy bit that has just been set. The garbage collector may then substantially automatically collect or reclaim all monitors whose busy bits have not just been set, even if some of those monitors may have busy bits which remain set to indicate a busy status from a prior garbage collection.

The steps associated with the various processes that are associated with the present invention may generally be widely varied, e.g., individual steps may be altered. In addition, steps may be removed, added, and reordered. For instance, the method of acquiring access to and operating on an object may include determining whether a thread already has a pointer to a monitor. If the thread already has a pointer to a monitor, then that pointer may be overwritten by a pointer to the "current" monitor, or the monitor associated with the object that is to be locked. Alternatively, if the thread already has a pointer to the current monitor, then the step of storing a pointer to the monitor may be eliminated without departing from the spirit or the scope of the present invention.

Additionally, the steps associated with acquiring access to and operating on an object may vary widely. That is, the method of acquiring access to an operating on an object may be substantially any suitable method which incorporates marking a monitor as being busy. By way of example, the steps may include locking an object, storing a pointer from a thread to a monitor, performing a wait or similar operation, clearing the pointer, and unlocking the object.

The use of reference pointers from threads substantially directly to monitors has been described as being suitable for use in a system which executes a Java™ virtual machine. In general, however, the use of such reference pointers may be implemented within substantially any system which executes a suitable virtual machine. A suitable virtual machine may include, but is not limited to, any virtual machine which supports the use of monitors, whether such a virtual machine is a Java™ virtual machine or otherwise, e.g., a Smalltalk virtual machine.

Although a wait action generally causes a lock count of a monitor to be at least temporarily set to zero, it should be appreciated that other actions may also cause a lock count of a monitor to be set to zero. When such actions are likely to be followed by actions which require a monitor to be associated with an object, e.g., a lock action, then a garbage collection performed during such actions may be prevented from reclaiming the monitor as well.

More than one thread may generally reference a particular monitor. Some systems, however, may support only one thread having a reference to a particular monitor. In such systems, when a first thread which has a reference to a monitor is executing a wait action and a second thread attempts to set a pointer to the monitor, the reference that is associated with the first thread may identified and cleared without departing from the spirit or the scope of the present invention.

The present invention has been described in terms of monitors. However, the present invention may be applied to substantially any other suitable synchronization construct. Therefore, the present examples are to be considered as illustrative and not restrictive, and the invention is not to be limited to the details given herein, but may be modified within the scope of the appended claims.

What is claimed is:

1. A method for reducing overhead associated with providing a monitor for an object included in a multi-threaded, object-based computing system, the computing system including a plurality of monitors which includes a first monitor, the method comprising:

setting a first pointer from the first monitor to the object;

setting a second pointer from the object to the first monitor;

setting a third pointer from a thread to the object, wherein the thread is arranged to execute on the object; and setting a reference substantially directly from the thread to the first monitor, wherein setting the reference includes updating contents of a reference field associated with the thread;

invoking the object using the thread, wherein said invoking of the object using the thread includes initiating a wait action, the wait action being arranged to place the object into a wait state; and performing a memory reclamation during the wait state, wherein said performing of a memory reclamation during the wait state includes:

identifying the contents of the reference field,
using the contents of the reference field to identify the first monitor, and
updating the contents of a monitor field associated with the first monitor to indicate that the first monitor is in use.

2. A method as recited in claim 1 wherein setting the reference occurs substantially when the thread acquires a lock to the object.

3. A method as recited in claim 1 wherein setting the reference includes setting a boolean reference count.

4. A method as recited in claim 1 wherein said method further comprises:
associating the first monitor with the object.

5. A method as recited in claim 1 wherein said associating a monitor with the object includes obtaining the monitor from a freelist of monitors.

6. A method for reducing overhead as recited in claim 1 wherein performing a memory reclamation during the wait state further includes:
scanning through substantially all monitors included in the plurality of monitors; and
reclaiming substantially any monitor included in the plurality of monitors that is not indicated as being in use, wherein the first monitor is not reclaimed because the contents of the monitor field associated with the first monitor indicate that the first monitor is in use.

7. A computer program product for reducing overhead associated with providing a monitor for an object included in a multi-threaded, object-based computing system, the computing system including a plurality of monitors which includes a the first monitor, the computer program product comprising:
computer code for setting a first pointer from the first monitor to the object;
computer code for setting a second pointer from the object to the first monitor;
computer code for setting a pointer from a thread to the object, wherein the thread is arranged to execute on the object;
computer code for setting a reference substantially directly from the thread to the first monitor, wherein setting the reference include updating contents of a reference field associated with the thread;
computer program code for invoking the object using the thread, wherein said invoking of the object using the thread includes initiating a wait action, the wait action being arranged to place the object into a wait state;
computer code for performing a memory reclamation during the wait state, wherein said performing of a memory reclamation during the wait state includes:
identifying the contents of the reference field,
using the contents of the reference field to identify the first monitor, and
updating the contents of a monitor field associated with the first monitor to indicate that the first monitor is in use; and
a computer-readable medium that stores the computer codes.

8. A computer program product according to claim 7 wherein the computer code for setting the reference includes computer code for setting a boolean reference count.

9. A computer program product according to claim 7 wherein the computer-readable medium is one selected from the group consisting of a hard disk, a floppy disk, a data signal embodied in a carrier wave, a tape drive, an optical drive, and a CD-ROM.

10. A computer program product according to claim 7 wherein the computer code for performing a memory reclamation during the wait state includes:
computer code for scanning through substantially all monitors included in the plurality of monitors; and
computer code for reclaiming substantially any monitor included in the plurality of monitors that is not indicated as being in use, wherein the first monitor is not reclaimed because the contents of the monitor field associated with the first monitor indicate that the first monitor is in use.

11. A computer program product according to claim 7 wherein the computer-readable medium is one selected from the group consisting of a hard disk, a floppy disk, a data signal embodied in a carrier wave, a tape drive, an optical drive, and a CD-ROM.

12. A computer program product as recited in claim 7, wherein setting the reference includes setting a Boolean reference count.

13. A computer program product as recited in claim 12 wherein said associating of a monitor includes obtaining the monitor from a freelist of monitors.

14. A computer program product as recited in claim 7, further comprising:
computer code for associating a monitor with the object.

15. A computer system comprising:
memory;
at least one processor which is capable of operating to:
set a first pointer from a first monitor to an object;
set a second pointer from the object to the first monitor;
set a third pointer from a thread to the object, wherein the thread is arranged to execute on the object; and
set a reference substantially directly from the thread to the first monitor, wherein setting the reference includes updating contents of a reference field associated with the thread;
invoke the object using the thread, wherein invoking the object using the thread includes initiating a wait action, the wait action being arranged to place the object into a wait state; and
perform a memory reclamation during the wait state, wherein said performing of a memory reclamation during the wait state includes:
identify the contents of the reference field;
using the contents of the reference field to identify the first monitor; and
updating the contents of a monitor field associated with the first monitor to indicate that the first monitor is in use.

16. A computer system as recited in claim 15, wherein said at least one processor is further capable of operating to:
scan through substantially all monitors included in the plurality of monitors; and
reclaim substantially any monitor included in the plurality of monitors that is not indicated as being in use, wherein the first monitor is not reclaimed because the contents of the monitor field associated with the first monitor indicate that the first monitor is in use.

17. A computer system as recited in claim 15, wherein setting the reference includes setting a boolean reference count.

18. A computer system as recited in claim 15, wherein said computer system is further capable of operating to associate the monitor with the object.

19. A computer system as recited in claim 15, wherein said associating a monitor with the object includes obtaining the monitor from a freelist of monitors.

* * * * *

UNITED STATES PATENT AND TRADEMARK OFFICE
CERTIFICATE OF CORRECTION

PATENT NO. : 6,951,018 B2
DATED : September 27, 2005
INVENTOR(S) : Long et al.

It is certified that error appears in the above-identified patent and that said Letters Patent is hereby corrected as shown below:

Column 13,
Line 34, change "includes a the" to -- includes a --.

Signed and Sealed this

Twenty-fifth Day of April, 2006

JON W. DUDAS
*Director of the United States Patent and Trademark Office*